United States Patent
Wu et al.

(10) Patent No.: US 8,098,932 B2
(45) Date of Patent: Jan. 17, 2012

(54) COLOR CORRECTION METHOD AND APPARATUS OF DISPLAY APPARATUS

(75) Inventors: Yen-Hsing Wu, Hsin Chu County (TW); Chun-Hsing Hsieh, Hsin Chu (TW)

(73) Assignee: Realtek Semiconductor Corp., Hsinchu (TW)

( * ) Notice: Subject to any disclaimer, the term of this patent is extended or adjusted under 35 U.S.C. 154(b) by 918 days.

(21) Appl. No.: 12/119,802

(22) Filed: May 13, 2008

(65) Prior Publication Data

US 2008/0285851 A1 Nov. 20, 2008

(30) Foreign Application Priority Data

May 14, 2007 (TW) ................................ 96117047 A

(51) Int. Cl.
*G06K 9/00* (2006.01)
(52) U.S. Cl. ........................................ 382/167; 382/274
(58) Field of Classification Search .................. 382/167, 382/274

See application file for complete search history.

(56) References Cited

U.S. PATENT DOCUMENTS

| 6,912,306 | B1 | 6/2005 | Nakabayashi et al. | |
|---|---|---|---|---|
| 2003/0189558 | A1* | 10/2003 | Aoki et al. | 345/204 |
| 2004/0120576 | A1* | 6/2004 | Kim | 382/167 |

* cited by examiner

*Primary Examiner* — Phuoc Tran

(74) *Attorney, Agent, or Firm* — Muncy, Geissler, Olds & Lowe, PLLC

(57) ABSTRACT

The invention discloses a color correction method for adjusting the color performance of a display apparatus. The color correction method first displays a plurality of images on a panel of the display apparatus and measures the chromatic value and the luminance of each image so as to obtain the color characteristics of the display apparatus. According to the color characteristics, a corresponding color matrix is generated which is located at the CIE XYZ color space. Next, an output matrix is outputted by performing an operation between the color matrix and a gain matrix. Next, the elements in gain matrix are adjusted in order to have the output matrix be equal to a target matrix substantially. Finally, the display apparatus is set for calibrating the color performance thereof in accordance with the elements of the adjusted gain matrix.

15 Claims, 3 Drawing Sheets

COLOR CORRECTION METHOD AND APPARATUS OF DISPLAY APPARATUS

BACKGROUND OF THE INVENTION (a) Field of the Invention

The invention relates to a color correction method, particularly to a color correction method for a display apparatus and a color correction apparatus thereof.

(b) Description of the Related Art

Accompanying with the advance of technology, commercial display apparatuses are diversified, commonly seen like a CRT TV, a liquid crystal display, a plasma TV, and a back projection TV. Since the image displaying principle for each apparatus is different, the color presentation is different. Thus, how to promote the color reproduction efficiency of a display apparatus is an important task. The signal processing for image color reproduction of a display apparatus comprises the following two major subjects.

At first, each display apparatus has its own color displaying characteristic and the color coordinates of a RGB three-primary color image shown by the display apparatus in a color space comprise a specific color gamut. In order to have the image signal inputted by each display apparatus be displayed with correct and consistent colors, the color displaying characteristic of each display apparatus should be complied and the color gamut mapping method should be utilized to have the color appearance of the image displayed by each display apparatus be the same.

Secondly, the image signal transmitted to the display apparatus has a non-linear relation between the gray level and the signal intensity thereof. Such a relation is called "gamma characteristic". The gamma characteristic can be represented by a function with a non-linear curve. As the inputted image pixel datum signal is "x", the luminance of the pixel is represented by $x^\gamma$, where $\gamma$ is a gamma exponent that changes with the corresponding specification of the image signal. In order to have the linear relation between the reproduced image pixel and the intensity of the original image signal, the display apparatus needs an image processing unit to perform Gamma correction for the image signal. Generally, there are two types of gamma correction methods. One method is to use digital signal processing (DSP) to calculate the gray level corresponding to the input value by the gray function. One method is to use a look-up table to obtain the gray level corresponding to the input value. The look-up table records the calculated gray level before and after conversion and is built in firmware or hardware. When performing gamma correction, the input value is used to find out the corresponding output value.

Please refer to FIG. 1 that is a schematic diagram illustrating the system configuration of a display apparatus 1 according to the prior art. As shown in FIG. 1, an image source S inputs an image signal to the display apparatus 1. The image signal is processed by an image processing unit 10 and then outputted to a panel 16 for displaying. The image processing unit 10 comprises a Gamma converting module 12 and a color gamut mapping module 14. The Gamma converting module 12 is to perform Gamma conversion for the image signal and the color gamut mapping module 14 is to perform color gamut mapping for the image signal. The needed parameters for the Gamma converting module 12 and the color gamut mapping module 14 to perform Gamma conversion and color gamut mapping, respectively, are set by a color correction process after the display apparatus 1 is assembled.

In the prior technique, the color correction process includes the steps of displaying a full-white image on the panel 16 of the display apparatus 1, measuring the chromatic value and the luminance to obtain the Gamma characteristic and the color gamut of the display apparatus 1, setting the parameters for the Gamma converting module and the color gamut according to the measured chromatic value and luminance value. After the parameters are set, the display apparatus 1 is again driven to display the full-white image on the panel 16 and the chromatic value and the luminance of the full-white image are measured to confirm that a target color temperature range is achieved. If the target color temperature range is achieved, the parameter setting for the display apparatus 1 is completed. If not, the parameter setting for the display apparatus 1 is continued until the target color temperature, range is achieved. However, this color correction process is to perform non-linear RGB gain adjustment based solely on the full-white image and thus only the full-white image can reach the target color temperature range while the image with the rest of the gray level can not.

BRIEF SUMMARY OF TEE INVENTION

One object of the invention is to provide a color correction method for a display apparatus and a color correction apparatus thereof by performing a chromatic adaptation process to adjust the color characteristic of the display apparatus so as to have the output picture of the display apparatus fulfill the color temperature requirement.

The invention provides a color correction method, applicable to the output color adjustment of a display apparatus. The display apparatus includes an image processing unit for controlling the output color. The color correction method comprises the following steps. At first, at least an image signal is displayed on a panel of the display apparatus. The image signal is measured to obtain a color matrix where the color matrix is located in a linear space. An operation between the color matrix and a gain matrix in the linear space is performed to output an output matrix. The gain matrix is adjusted so that the output matrix is substantially the same as a target matrix. Finally, the image processing unit is set up according to the gain matrix to correct the output color of the display apparatus.

The invention further provides a color correction apparatus, applicable to the output color adjustment of a display apparatus. The display apparatus includes an image processing unit for controlling the output color. The color correction apparatus comprises: a calorimeter, a display characteristic calculating module, a color adaptation calculating module, an adjusting unit, and a setup module. The calorimeter is to measure at least one image signal displayed by the display apparatus. The display characteristic calculating module is to calculate the image signal measured by the colorimeter to generate a color matrix wherein the color matrix is located in a linear space. The color adaptation calculating module is to perform an operation between the color matrix and a gain matrix in the linear space to output an output matrix. The adjusting unit is to adjust the gain matrix so that the output matrix is substantially the same as a target matrix. The setup module is to set up the image processing unit according to the gain matrix to correct the output color of the display apparatus.

The above and following descriptions accompanying with the figures further illustrate the detailed means and effects of the invention, in order to achieve the goal of the invention. In addition, other objectives and advantages of the invention will be described in the section of detailed description of the invention accompanying with the figures.

DETAILED DESCRIPTION OF THE INVENTION

Figure 1:
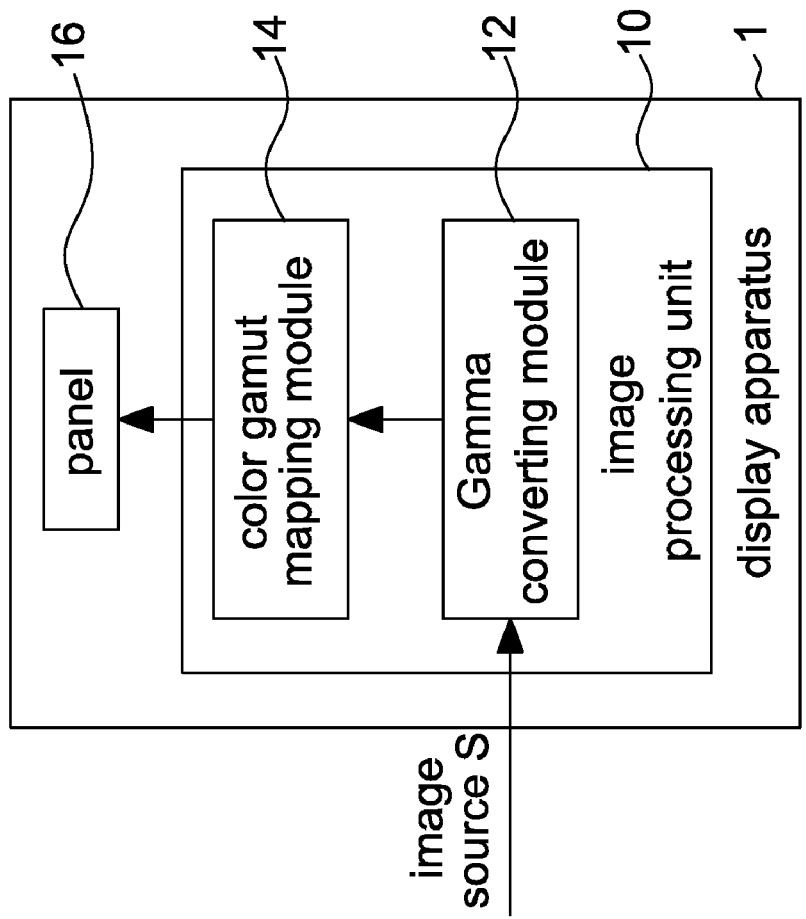
FIG. 1 shows a schematic diagram illustrating a system configuration of a display apparatus according to the prior art.
Figure 2:
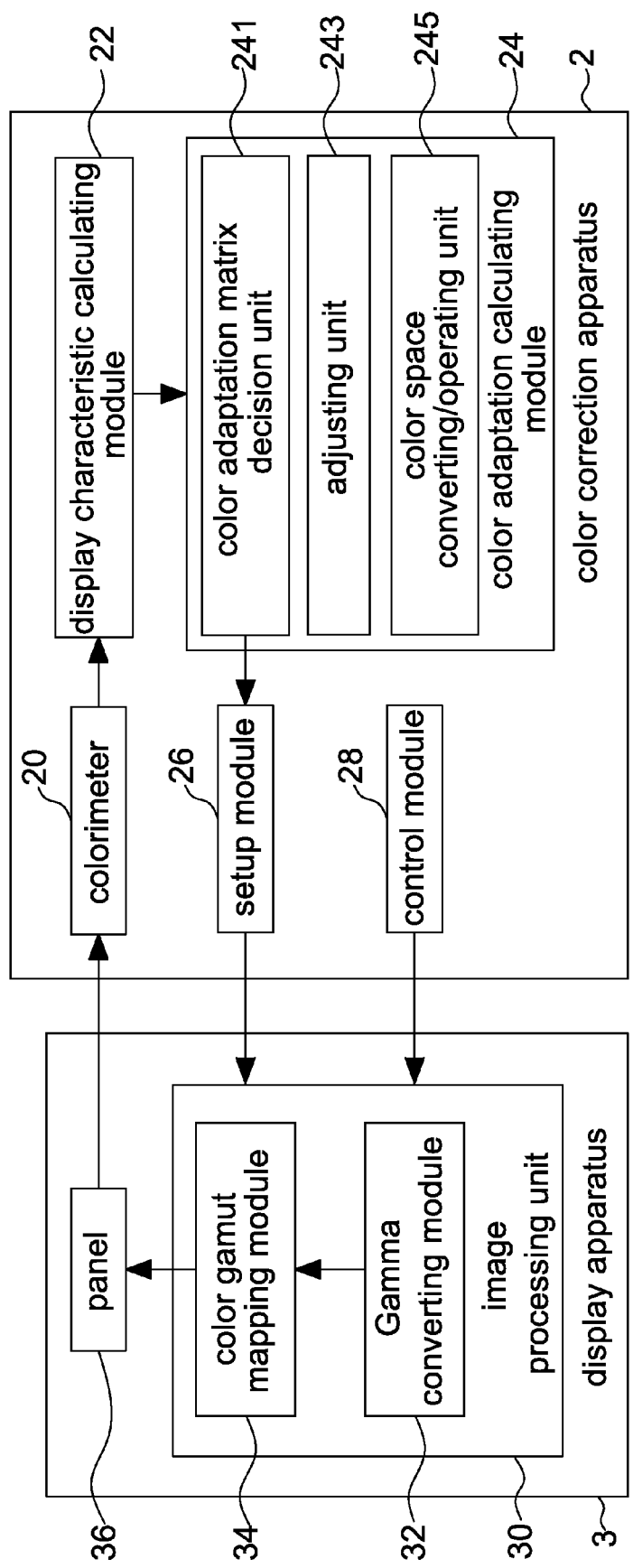
FIG. 2 shows a system configuration schematic diagram illustrating a color correction apparatus to perform color correction for a display apparatus according to the invention.

At first, please refer to FIG. 2 which shows a system configuration schematic diagram illustrating a color correction apparatus 2 to perform color correction for a display apparatus 3 according to a first embodiment of the invention. The color correction apparatus 2 can be complied with the conversion relation adjustment between the input and output images of the display apparatus 3 so that the color and color temperature of the output picture of the display apparatus 3 fulfill the preset requirements.

As shown in FIG. 2, the display apparatus 3 comprises a panel 36 and an image processing unit 30. The image signal externally inputted to the display apparatus 3 is processed by the image processing unit 30 to have signal conversion and then outputted to the panel 36 for displaying. The image processing unit 30 further comprises a Gamma converting module 32 and a color gamut mapping module 34. The Gamma converting module 32 is to perform Gamma conversion for the image signal and the color gamut mapping module 34 is to perform color gamut mapping for the image signal. The conversion relation of the image signal performed by the Gamma converting module 32 and the color gamut mapping module 34 are set by a color correction process via the color correction apparatus 2, after the display apparatus 3 is assembled.

The color correction apparatus 2 comprises a control module 28. According to the preset process, the control module 28 drives the display apparatus 3 to display the image with a plurality of colors on the panel 36. The image with a plurality of colors comprises a full-white image, a full-red image, a full-green image, and a full-blue image. As shown in FIG. 2, the color correction apparatus 2 comprises a calorimeter 20 to receive the full-white image, the full-red image, the full-green image, and the full-blue image and to measure the optical characteristics like the chromatic values and the luminance of these images.

In FIG. 2, the color correction apparatus 2 comprises a display characteristic calculating module 22, a color adaptation calculating module 24, and a setup module 26. The color adaptation calculating module 24 further comprises a color adaptation matrix decision unit 241, an adjusting unit 243, and a color space converting/operating unit 245. The color correction apparatus 2 can be implemented by a computer system. The display characteristic calculating module 22, the color adaptation calculating module 24, the setup module 26, and the control module 28 can be implemented by the software accompanying with the computer system to facilitate operation/control resources. Accordingly, each function executed by each module of the color correction apparatus 2 together with the color correction method will be described in the following.

Figure 3:
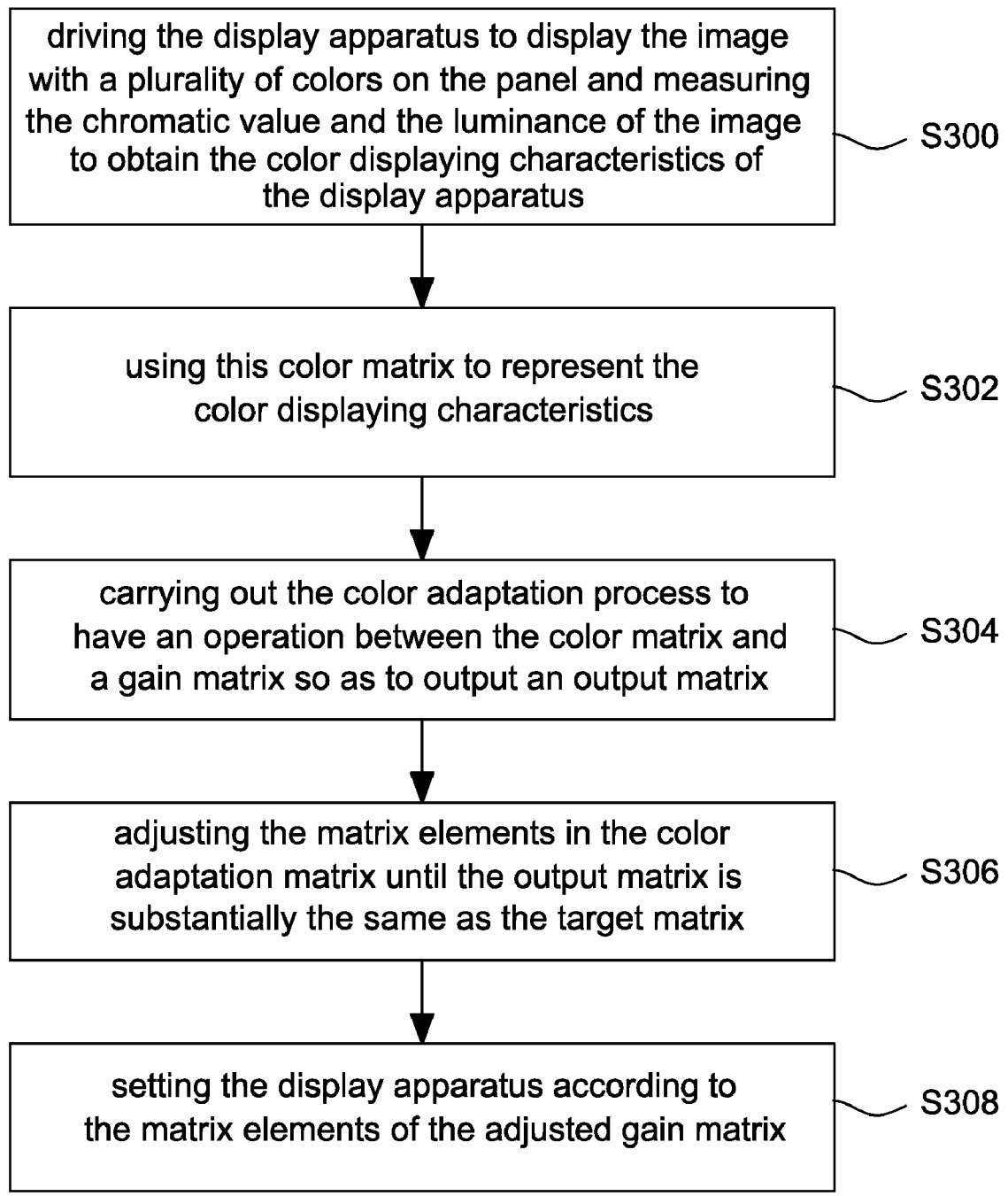
FIG. 3 shows a flow chart illustrating the steps of the color correction method according to the first embodiment of the invention.

Next, please refer to FIG. 3 which shows a flow chart illustrating the steps of the color correction method according to the first embodiment of the invention. The related system configuration is shown in FIG. 2. As shown in FIG. 3, the color correction method comprises the following steps.

At first, the control module 28 drives the display apparatus 3 to display the image with a plurality of colors on the panel 36. The colorimeter 20 receives the image and measures the chromatic value and the luminance of the image to obtain the color displaying characteristics of the display apparatus 3. The color displaying characteristics include the color gamut and the gamma of the panel 36, in the step S300.

According to one example, the step S300 further comprises the following steps:

The first step is that the control module 28 drives the display apparatus 3 to display a full-white image on the panel 36 and the colorimeter 20 receives the full-white image, measures the chromatic value and the luminance of the full-white image, and outputs these measured values to the display characteristic calculating module 22 to obtain the color gamut of the display apparatus 3; and The second step is that the control module 28 drives the display apparatus 3 to display the images with all gray levels for the full-red image, the full-green image, and the full-blue image on the panel 36 and the colorimeter 20 receives and measures the chromatic values and the luminance of the images and outputs these measured values to the display characteristic calculating module 22 to obtain the gamma of the display apparatus 3.

Then, the display characteristic calculating module 22 generates a color matrix according to the color displaying characteristics obtained from the step S300 to use this color matrix to represent the color displaying characteristics (step S302). The color matrix is located in a CIE XYZ linear space to represent the color appearance state of the image signal after processed by the image processing unit 30. A matrix [XYZ] is used to represent the above-mentioned color matrix. Following that, the display characteristic calculating module 22 outputs the color matrix to the color adaptation calculating module 24.

In one example, it is assumed that the color matrix is obtained at the color temperature of 6500K (D65) from the backlight source of the display apparatus 3. The color adaptation calculating module 24 carries out the color adaptation process to have an operation between the color matrix [XYZ] and a gain matrix so as to output an output matrix $[X_1 Y_1 Z_1]$ (step S304). In addition, during the color adaptation process, the matrix elements in the gain matrix can be adjusted to have the output matrix $[X_1 Y_1 Z_1]$ substantially be equal to a target matrix $[X_t Y_t Z_t]$ corresponding to a target color temperature (for example, color temperature of 5000K, D50). Besides, the color adaptation process further comprises the following three steps.

The first step is that the color adaptation calculating module 24 uses a conversion matrix to convert the color matrix into an IPT LMS color space to obtain a first converting matrix [LMS], where the mathematical conversion is shown as the equation (1).

$$\begin{bmatrix} L \\ M \\ S \end{bmatrix} = \begin{bmatrix} 0.8951 & 0.2664 & -0.1614 \\ -0.7502 & 1.7135 & 0.0367 \\ 0.0389 & -0.0685 & 1.0296 \end{bmatrix} \cdot \begin{bmatrix} X \\ Y \\ Z \end{bmatrix} \quad (1)$$

In equation (1), the conversion matrix is a Bradford matrix.

The inventor uses the Bradford matrix to convert the color matrix from the CIE XYZ color space to the IPT LMS color space.

The second step is that an operation between the obtained first color converting matrix and a color adaptation matrix is performed to obtain a second color converting matrix, where the mathematical conversion is shown as the equation (2).

$$\begin{bmatrix} L' \\ M' \\ S' \end{bmatrix} = \begin{bmatrix} \frac{L_{CT}}{L_{D65}} & 0 & 0 \\ 0 & \frac{M_{CT}}{M_{D65}} & 0 \\ 0 & 0 & \frac{S_{CT}}{S_{D65}} \end{bmatrix} \cdot \begin{bmatrix} L \\ M \\ S \end{bmatrix} \quad (2)$$

The color adaptation matrix adjusts the first color converting matrix [LMS] corresponding to the initial color temperature D65 to the second color converting matrix [L'M'S'] corresponding to the target color temperature D50. As shown in the equation (2), the color adaptation matrix elements include the LMS distribution ratio ($L_{D65}$, $M_{D65}$, $S_{D65}$) of the initial color temperature D65 and the LMS distribution ratio ($L_{D50}$, $M_{D50}$, $S_{D50}$) of the target color temperature D50. The above ($L_{D65}$, $M_{D65}$, $S_{D65}$) and ($LD_{50}$, $_{MD50}$, $S_{D50}$) can be obtained from the known data.

The third step is that an inverse conversion matrix is used to convert the second color converting matrix [L'M'S'] back to the CIE XYZ color space to obtain an output matrix [$X_1 Y_1 Z_1$] where the inverse conversion matrix is the inverse matrix of the Bradford matrix.

The mathematical conversion from the first step to the third step can be summarized by the equation (3) where the matrix A and the matrix BM represent the color adaptation matrix and the conversion matrix (i.e. Bradford matrix), respectively.

$$\begin{bmatrix} X_1 \\ Y_1 \\ Z_1 \end{bmatrix} = [BM]^{-1}[A][BM] \begin{bmatrix} X \\ Y \\ Z \end{bmatrix} \quad (3)$$

According to one embodiment of the invention, the color adaptation matrix decision unit 241 built in the color correction apparatus 2 is used to store the gain matrix ($[BM]^{-1}*[A]*[BM]$). The color space converting/operating unit 245 couples to the color adaptation matrix decision unit 241. The color space converting/operating unit 245 is to convert the color matrix to the IPT LMS color space by the conversion matrix BM so as to generate the first color converting matrix, to perform an operation between the first color conversion matrix and the color adaptation matrix A so as to generate the second color converting matrix, and finally to convert the second color conversion matrix back to the CIE XYZ color space by the inverse conversion matrix $BM^{-1}$ so as to generate an output matrix.

The color space converting/operating unit 245 determines if the output matrix [$X_1 Y_1 Z_1$] is the same as the target matrix [$X_t Y_t Z_t$]. If they are not the same, an adjusting unit 243 in the color adaptation calculating module 24 is used to adjust the matrix elements in the color adaptation matrix A until the output matrix [$X_1 Y_1 Z_1$] is substantially the same as the target matrix [$X_t Y_t Z_t$] (step S306). According to one embodiment of the invention, the color space converting/operating unit 245 can determine if the output matrix [$X_1 Y_1 Z_1$] is the same as the target matrix [$X_t Y_t Z_t$] by converting [$X_1 Y_1 Z_1$] into $Y_{xy}$ representation for determination. In other words, the output matrix [$X_1 Y_1 Z_1$] by the color adaptation process has a corresponding $Y_{xy}$ value (a constant) while the target matrix [$X_t Y_t Z_t$] has another corresponding $Y_{xy}$ value. Thus, by comparing the difference between these two $Y_{xy}$ values, whether the output matrix [$X_1 Y_1 Z_1$] and the target matrix [$X_t Y_t Z_t$] are the same or not can be determined. The above mentioned method in determining whether the output matrix [$X_1 Y_1 Z_1$] and the target matrix [$X_t Y_t Z_t$] are the same or not is just one example to illustrate the invention but it is not limited to this example. Besides, converting the color matrix into $Y_{xy}$ is well known to those who are skilled in the art and thus further details will not be given hereinafter.

Finally, the setup module 26 and the control module 28 sets the image processing unit 30 of the display apparatus 3 according to the matrix elements of the gain matrix ($[BM]^{-1}*[A]*[BM]$) adjusted internally by the color adaptation calculating module 24 (step S308). According to one embodiment of the invention, the image processing unit 30 comprises a color gamut mapping module 34 and a Gamma converting module 32. As the gain matrix is adjusted by the color adaptation process, the setup module 26 determines the color gamut relation and the Gamma inverse conversion relation according to the adjusted gain matrix. The control module 28 is used to set up and adjust the parameters for the color gamut mapping module 34 and the Gamma converting module 32 and drives the display apparatus 3 to display the image signal on the panel 36, according to the parameters set in the image processing unit 30.

Furthermore, as the image processing unit 30 is set up, a full-white image signal is again displayed on the panel 36 of the display apparatus 3. The output color temperature of the output full-white image signal is measured. In order to determine if adjusting the display apparatus 3 is to be continued or not, it is determined if the output color temperature reaches a target color temperature (for example, color temperature 5000K, D50) or the color temperature difference between the output color temperature and the target color temperature is less than a predetermined value. If the color temperature difference is not less than the predetermined value, the color adaptation process is continued to adjust the color adaptation matrix A in the gain matrix and the adjusted gain matrix is again used to set the image processing unit 30 until the output color temperature reaches the target color temperature or the color temperature difference is less than the predetermined value.

According to the above embodiments, the color correction method and the color correction apparatus provided by the invention make the images (even RGB under any gray level) outputted by the display apparatus satisfy the color and color temperature requirements by performing the color adaptation process in the linear space. Therefore, the problem in the prior art that only adjusts the gain of RGB in a non-linear space (for example, RGB space), where only the full-white picture can pass the color test but the picture with the rest of grey level can not pass, can be resolved.

Although the present invention has been fully described by way of above-mentioned examples of embodiment, however, it should not be construed as any limitation on the scope of the invention. Various modifications or changes can be performed by those who are skilled in the art without deviating from the scope of the invention.

What is claimed is:

1. A color correction method of a display apparatus, applicable to an output color adjustment of a display apparatus, where the display apparatus includes an image processing unit for controlling the output color, the color correction method comprising the following steps:

displaying at least an image signal on a panel of the display apparatus;

measuring the image signal to obtain a color matrix wherein the color matrix is corresponding to a linear space;

performing an operation between the color matrix and a gain matrix in the linear space so as to output an output matrix;

adjusting the gain matrix so that the output matrix is substantially the same as a target matrix; and setting up the image processing unit according to the gain matrix to correct the output color of the display apparatus.

2. The color correction method according to claim 1, further comprising the following steps:

outputting the image signal repeatedly after setting up the image processing unit and measuring the output color temperature of the image signal;

determining whether the color temperature difference between the output color temperature and a target color temperature is less than a predetermined value; and adjusting the gain matrix if the color temperature difference is not less than the predetermined value and setting up the image processing unit according to the adjusted gain matrix to correct the output color of the display apparatus.

3. The color correction method according to claim 1, wherein the linear space is a CIE XYZ color space and the operation of the color matrix with the gain matrix further comprises the following steps:

using a conversion matrix to convert the color matrix into the IPT LMS color space for generating a first color converting matrix;

performing an operation between the first color converting matrix and a color adaptation matrix for generating a second color converting matrix; and using an inverse conversion matrix to convert the second color converting matrix back into the CIE XYZ color space and generating the output matrix.

4. The color correction method according to claim 3, wherein the conversion matrix is a Bradford matrix.

5. The color correction method according to claim 3, wherein the method of adjusting the gain matrix is to adjust the LMS ratio of the color adaptation matrix.

6. The color correction method according to claim 1, wherein the step of measuring the image signal to obtain the color matrix further comprises the following steps:

measuring the image signal to obtain a color displaying characteristics of the display apparatus wherein the color display characteristics include the color gamut and the gamma-of the panel; and generating the color matrix according to the color display characteristics wherein the color matrix corresponds to the chromatic value and the luminance of the image signal.

7. The color correction method according to claim 1, wherein the image processing unit of the display apparatus includes a color gamut mapping module and a gamma converting module.

8. The color correction method according to claim 1, wherein the image signal is a full white image.

9. A color correction apparatus, applicable to an output color adjustment of a display apparatus, where the display apparatus includes an image processing unit for controlling the output color, the color correction apparatus comprising:

a colorimeter for measuring at least one image signal displayed by the display apparatus;

a display characteristic calculating module for calculating the image signal measured by the colorimeter to generate a color matrix wherein the color matrix is corresponding to a linear space;

a color adaptation calculating module for operating the color matrix with a gain matrix in the linear space to output an output matrix;

an adjusting unit for adjusting the gain matrix so that the output matrix is substantially the same as a target matrix; and a setup module for setting up the image processing unit according to the gain matrix to correct the output color of the display apparatus.

10. The color correction apparatus according to claim 9, further comprising a control module for driving a panel of the display apparatus to display the image signal on the panel.

11. The color correction apparatus according to claim 9, wherein the image signal comprises a full white image, a full red image, a full green image, a full blue image.

12. The color correction apparatus according to claim 9, wherein the color matrix complies with the CIE XYZ color space and the color adaptation calculating module comprises:

a color adaptation matrix decision unit for storing the gain matrix where the gain matrix includes a conversion matrix, a color adaptation matrix and an inverse conversion matrix; and a color space converting/operating unit coupling to the color adaptation matrix decision unit for converting the color matrix to the IPT LMS color space to generate a first color converting matrix according to the conversion matrix, executing an calculating of the first color conversion matrix with the color adaptation matrix to generate a second color converting matrix, and converting the second color conversion matrix back to the CIE XYZ color space to generated the output matrix according to the inverse conversion matrix.

13. The color correction apparatus according to claim 12, wherein the conversion matrix is a Bradford matrix.

14. The color correction apparatus according to claim 12, wherein the adjusting unit is to adjust the LMS ratio of the color adaptation matrix.

15. The color correction apparatus according to claim 9, wherein the image processing unit of the display apparatus includes a color gamut mapping module and a gamma converting module.

* * * * *